INVENTORS
WILLIAM L. HENDRIX
JAMES P. MARKHAM
BY T. RALPH HUNNICUTT

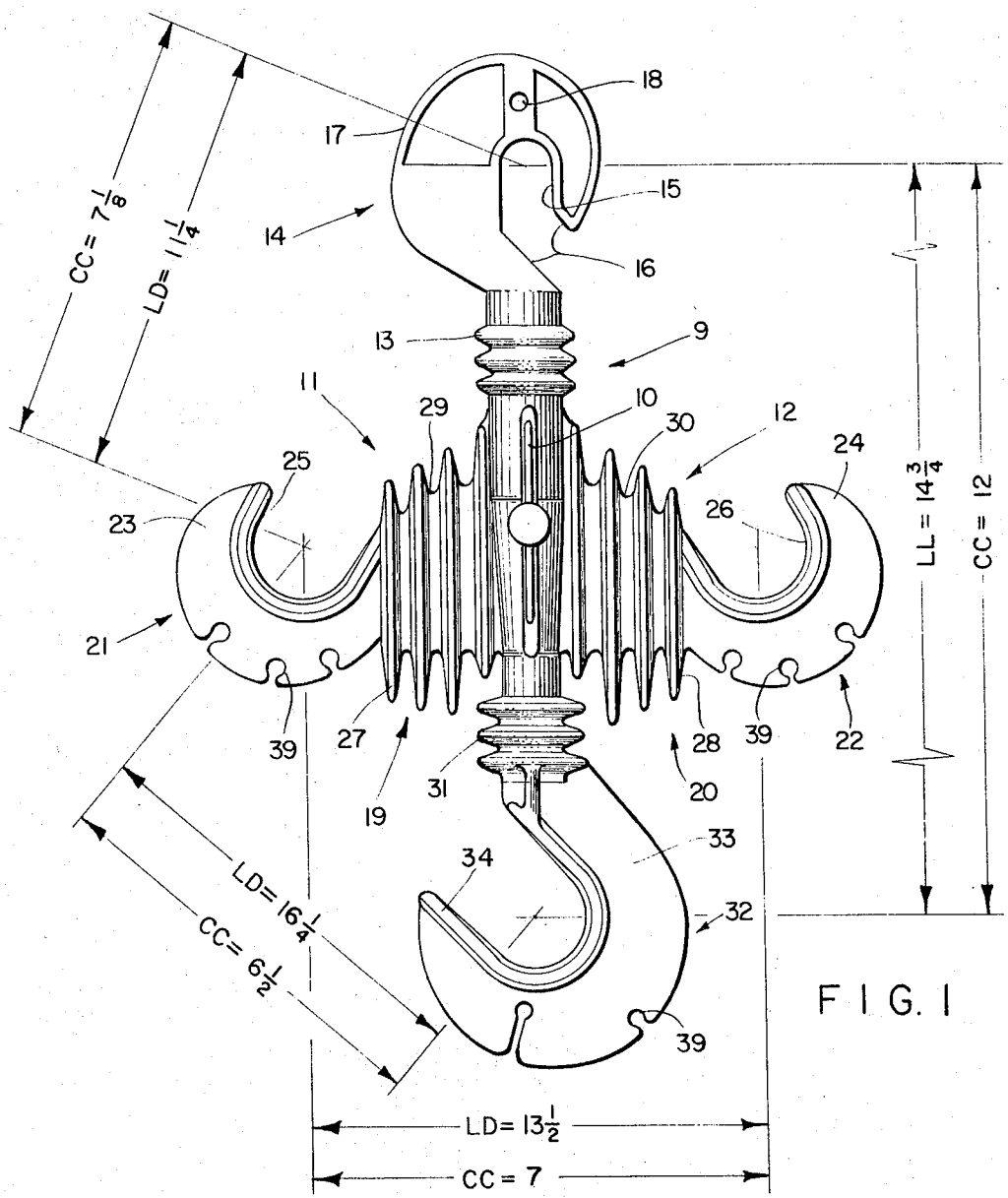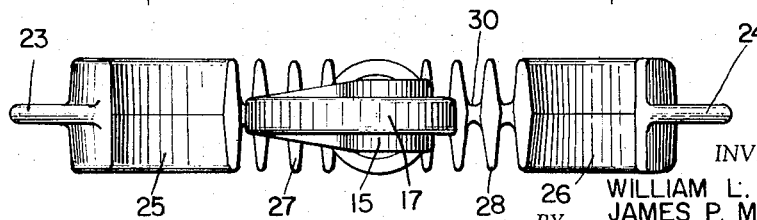

ATTORNEYS

Jan. 24, 1967  W. L. HENDRIX ET AL  3,300,576
AERIAL CABLE SPACER AND TIE APPARATUS
Filed May 23, 1966  3 Sheets-Sheet 3
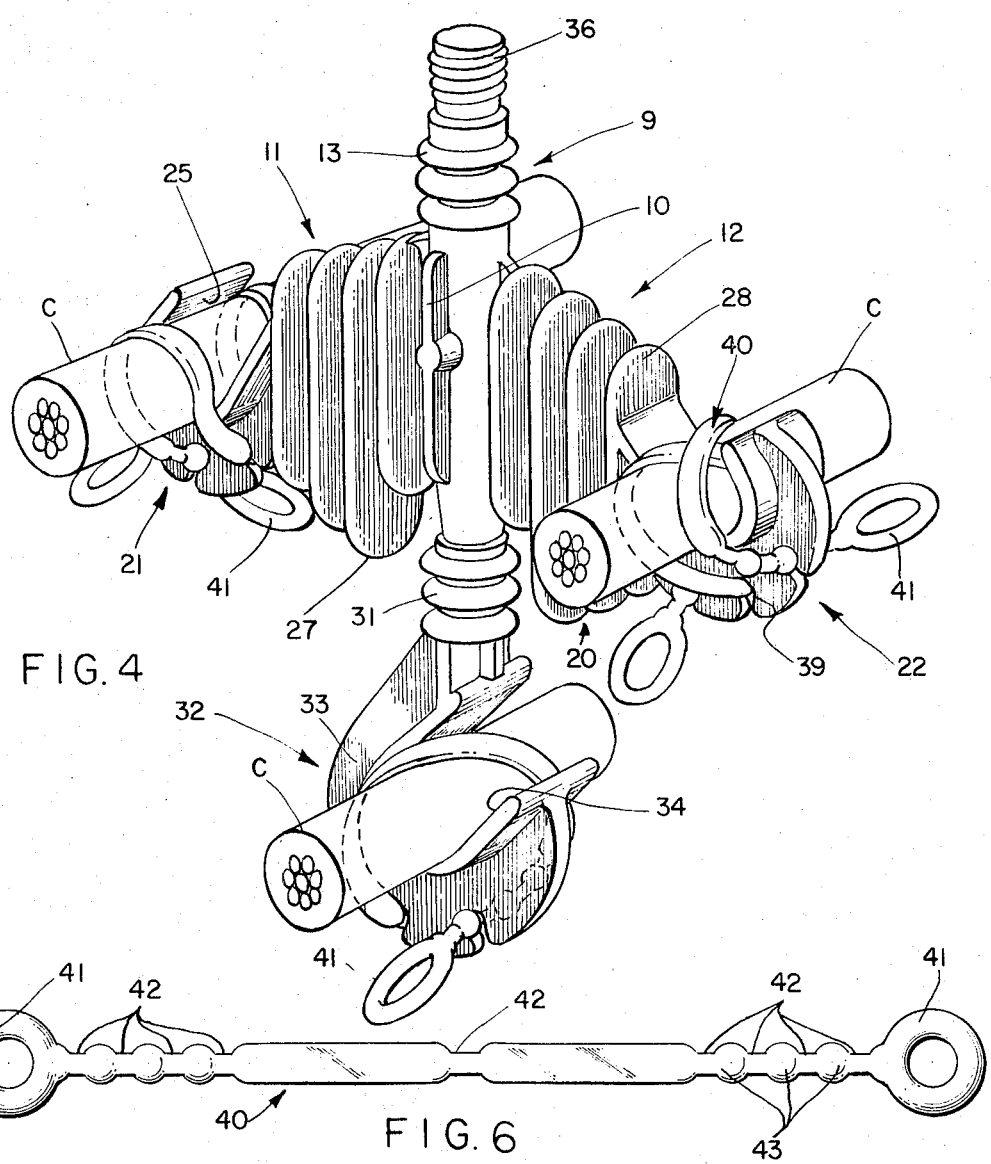
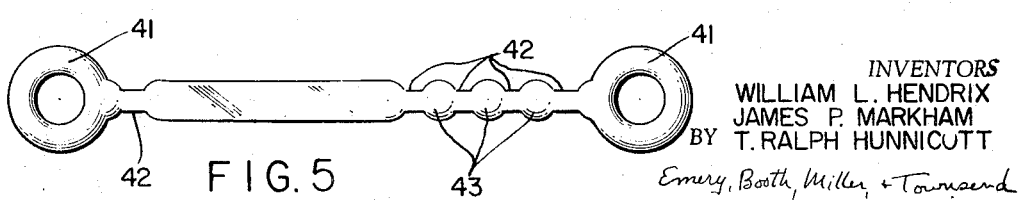
INVENTORS
WILLIAM L. HENDRIX
JAMES P. MARKHAM
BY T. RALPH HUNNICUTT
*Emery, Booth, Miller, & Townsend*
ATTORNEYS

United States Patent Office 3,300,576
Patented Jan. 24, 1967

3,300,576
AERIAL CABLE SPACER AND TIE
APPARATUS
William L. Hendrix, Amherst, James P. Markham, Milford, and Thomas Ralph Hunnicutt, Bedford, N.H., assignors to Hendrix Wire & Cable Corporation, Milford, N.H., a corporation of New Hampshire
Filed May 23, 1966, Ser. No. 559,674
8 Claims. (Cl. 174—146)

This application is a continuation-in-part of our prior application, Serial No. 223,757, filed September 14, 1962, now abandoned.

This invention relates to electric power distribution apparatus and more particularly to aerial cable. It affords outstanding improvements in the design, construction, and manipulation of aerial cable apparatus of the spacer type.

The volume of electricity consumed in this country has doubled in each decade of the last half century, and is expected to increase in at least that proportion in the next and subsequent decades. Thus in the next ten years the utilities will have to provide as much additional electric power generating and distributing capacity as they have in the last forty years.

To supply the constantly increasing electrical load has required and increasingly will require the raising of distribution voltages. Thus 13 kv. distribution circuits now compare in extent of use with the 4 kv. distribution circuits of ten years ago, and substation feeder lines formerly at 13 kv. have now gone to higher voltages such as 22, 34 and 40 kv.

With every increase in circuit voltages it is that much more difficult to construct or reconductor the distribution lines with open wire, for reasons of pole congestion, right of way requirements, and otherwise. The open wire problems are avoided, and also stormproofing advantages are afforded, by the use of aerial cable, of which the more recently introduced spacer-type is preferred for reasons, among others, of cost and workability.

But since the cost and weight saving is achieved with elimination of the shielding, the cable type here concerned was long considered safe only on 4 to 5 kv. circuits, and has more recently gained only limited acceptance up to, say, 10–15 kv. levels, because of the requirement that the cable insulation must withstand electrostatic charging currents which in the other aerial cable types are dissipated by reason of the incorporating therein of continuous metallic shielding.

In a grounded three phase distribution circuit there is a continuous electrostatic voltage pressure between any two insulated phase conductors and between any insulated phase conductors and the messenger or grounded neutral, inducing the flow of a charging (or electrostatic or condenser) current which varies directly with the distribution voltage.

The dielectric path from conductors to ground may be considered to comprise two impedances; the impedance of the cable insulation, $Z_c$; and the impedance of the spacer, $Z_s$. These two impedances, $Z_c$ and $Z_s$, are in series, and, while they cannot be infinite and will always allow some leakage (capacitive) current flow, it is nonetheless a requirement of the spacer cable design that the total impedance, $Z_c+Z_s$, be as high as possible, and, more particularly, sufficiently high to prevent damaging leakage current flow under all environmental or weather conditions.

The impedance of the cable insulation, $Z_c$, can be made high by selection of a material having the lowest possible dielectric constant and having also high surface resistance when wet as well as when dry, which latter requires the selection of an insulating material which has a good hydrophobic surface characteristic, or the ability to repel moisture.

Under this invention it is recognized that the spacer impedance, $Z_s$, must also be kept high. More particularly, since the impedances are in series, the voltage gradient across the two will depend upon the relative magnitudes of the impedances. So that with a current flow, and when $Z_c$ is larger than $Z_s$, the voltage gradient will be largest on $Z_c$.

It is found, then, that where the spacer impedance is less than the cable insulation impedance, the voltage gradient on the cable can, under extreme conditions, become large enough to produce electrical damage to the cable, as a result of electrical discharge on the surface of the conductor insulation. Under adverse environmental conditions corona and arcing are found to occur, producing an erosion or pitting of the surface. Serious damage by arcing is observed, that producing tracking or erosion of the surface which can reduce the insulation thickness to the point where under the voltage stress the remaining thickness will suffer dielectric breakdown, or puncture, and there will be a cable failure.

This invention proceeds from the recognition further that to prevent the accumulation or development of an unacceptably large voltage gradient on the cable conductors, with resultant breakdown of the conductor insulation, the impedance of the spacer should, as a matter of aerial cable design, be high enough at all times to protect the conductor insulation from harmful voltage gradients. With $Z_s$ sufficiently high in relation to $Z_c$ the conductors will not be faulted, and the spacers, as the least valuable part of the system, will take the damage if corona is to start. In other words, if the spacer impedance can be held high enough in relation to the conductor insulation impedance under wet as well as dry conditions, and even in contaminated atmospheres, the greatest part of the voltage drop will be on the spacer, and the conductor insulation will be protected against damaging voltage stresses under all normal outdoor overhead operating conditions of weather and atmosphere.

This is because—as studies of cable damage have shown—arcing and corona which cause tracking and erosion are more likely to be formed in areas of high voltage stress. Hence, again, the aerial cable design requirement, as to the conductor and spacer components, is that the ratio of $Z_s$ to $Z_c$ must be consistently high enough to make the spacer the one most likely to sustain the damage.

Accordingly, the principal object of this invention is to provide a new and improved aerial cable spacer having a surface impedance characteristic which under all normal weather conditions is maintained at a sufficiently high value such that the voltage drop caused by leakage currents thereacross is a substantial part of the voltage impressed between the messenger and conductors, and whereby the conductor insulation is protected against harmful voltage stresses, leakage currents and corona discharges. All weather high spacer impedance is achieved under the invention by obtaining a high capacitive impedance of the spacer insulation through use of material of low dielectric constant, and by obtaining and maintaining a high electrical surface resistance of the spacer. The surface resistance is affected by the condition of the surface (which in turn is dependent on the shape thereof), the material of the surface, and the leakage distance. Accordingly, under this invention there is employed for the spacer a material and design having high impedance when wet as well as when dry, which induces a desired surface condition even under adverse weather conditions, and which affords the necessary leakage distance.

The spacer hereof is fashioned therefore from materials selected to have, among others, suitable dielectric properties, and dielectric constant and power factor properties which desirably are as low as possible. Importantly also, the material to be selected for the invention spacer will have a hydrophobic characteristic, or the property or ability to maintain high electrical surface resistance when wet.

It will be appreciated that the leakage distance is somewhat limited by spacer displacement; that is, the elecrical surface resistance problem cannot be solved by increasing the conductor spacing indefinitely, because that is limited to a dimension which is consistent with the storm-proofing design requirement that the conductor should substantially underlie the messenger of the cable, which is compatible with strength requirements and pole height and tree clearance limitations, and which is desirable in respect to the effect of phase-to-messenger spacing on line reactance, power factor, and circuit voltage regulation.

Under this invention the problem is solved, and the spacer-type aerial cable is made safely operable at substantially higher voltages up to at least about 40 kv. by the provision of a spacer of new and improved design and construction affording it mechanical and electrical properties whereby it has greatly increased ability to withstand the potential for flow of charging currents under normal outdoor overhead operating conditions.

The greatly increased resistance to charging currents is afforded the spacer subject not only to dry clean atmosphere but also to adverse weather conditions such as exposing the spacer to various contaminants, to high humidity or wetting, to rainfall, or to a combination or succession of the same.

Our present invention provides, then, an aerial cable spacer of new and improved design and construction, characterized by surface impedance sufficiently high in relation to the impedance of the conductor insulation to prevent voltage breakdown and resultant cable failure under all normal outdoor overhead operating conditions of weather and atmosphere. Under this invention the spacer has a high enough spacer impedance when wet as well as when dry, and notwithstanding exposure to contaminated atmospheres, to protect the conductor insulation from high voltage stresses, leakage currents, and corona discharges.

The resistance to flow of the charging current with its attendant faulting or burning of the conductor is a function both of the effective length of and the resistivity of the spacer surface. The effective spacer length is the length of the spacer surface in the leakage path between conductors. The resistivity of the spacer in that path, under all weather outdoor operating conditions, is dependent upon the accumulation of dust and other contaminants on and also the wetting of the spacer surface.

Accordingly, the spacer of the invention is distinguished by improved resistance to charging current flow both in respect to increase in leakage path length and in respect to prevention of collection or flow of contaminants or water on or along the leakage paths.

Under this invention, then, without increasing conductor spacing, both the between-phase leakage distance and the all-weather surface resistance of the spacer are substantially increased, sufficiently so as to hold the charging current to within safe limits at substantially higher operaing voltages than heretofore considered possible, and more particularly up to and including at least about 40 kv.

The invention spacer is distinguished further by open conductor seats and cable tie means readily manipulable with hot line tools, whereby the spacer may be replaced, or a conductor removed for repair, while the cable is energized.

In the drawings:

FIG. 1 is an elevation of one embodiment of the cable spacer;

FIG. 2 is a top view thereof;

FIG. 4 is a like view taken from the opposite side of the cable;

FIG. 5 shows one embodiment of the conductor tie; and

FIG. 6 shows another embodiment of the tie.

Figure 3:
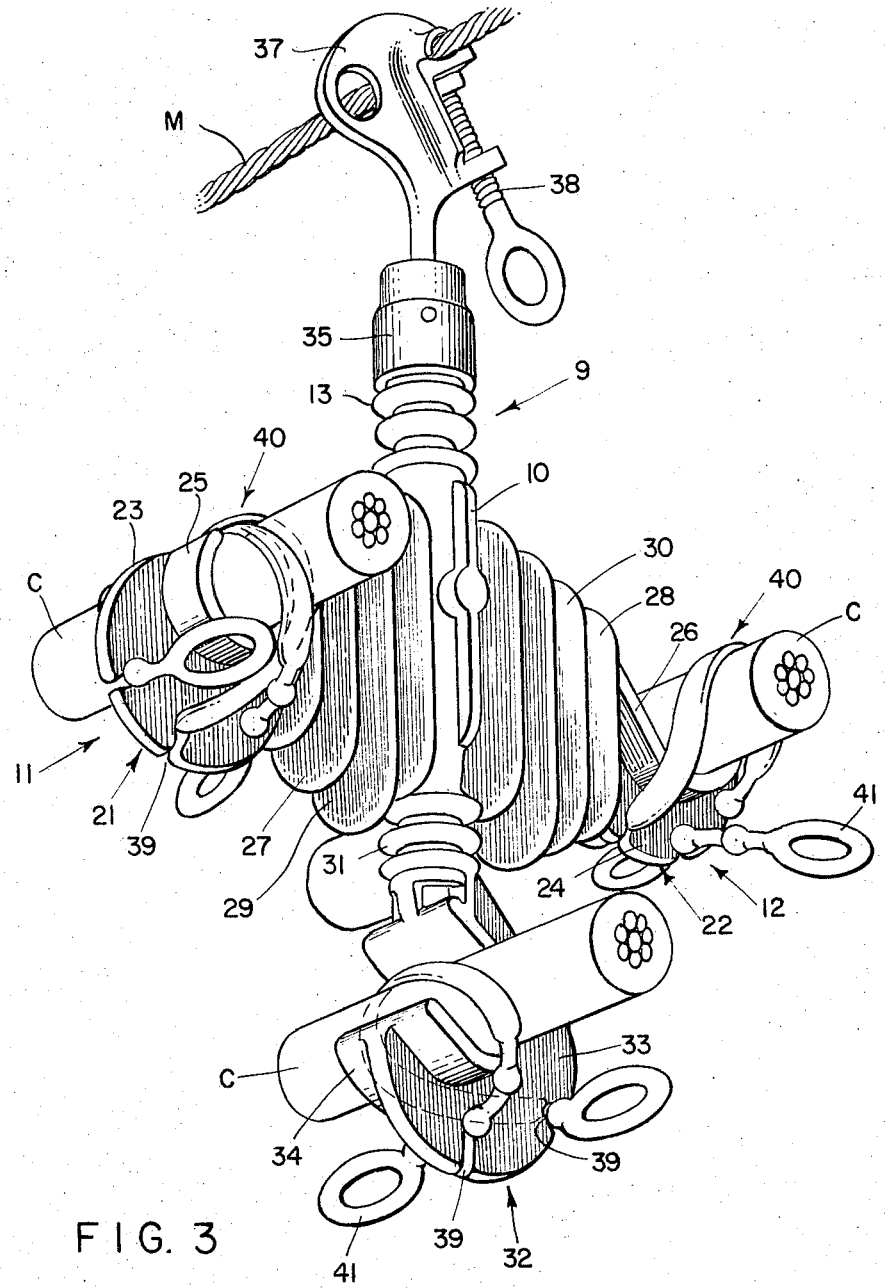
FIG. 3 is a perspective of another embodiment of the spacer, and showing various modes of securing the cable conductors with the invention tie means.

In all forms herein illustrated, the invention spacer will be understood to support from its messenger M (FIG. 3) the conductors C of an aerial cable of three (A, B, C) phase type and wherein the messenger and conductors are spaced in the diamond pattern which is preferred over the inverted Y because of the easier access to the B phase conductor.

In accordance with the invention, and as will be apparent from the accompanying drawing and the following description thereof, the construction and arrangement of the spacer hereof is also to provide equilateral triangular spacing of the conductor seats, and to provide as balanced or equal as possible leakage paths or surface distances between the individual phase conductors and ground. The arrangement of the conductors in an equilateral triangle affords, of course, the optimum electrical operation of the cable system. And as will be understood by those skilled in the art, with the three phases balanced to ground, the ground leakage currents are held to a minimum, because the three phases tend to neutralize each other, whereas if the phase conductors are not balanced, leakage current to ground will flow more readily, from the most out-of-balance conductor, and leading to damage of the conductor insulation.

It will be appreciated that for reasons of cost and weight saving the spaced conductors of aerial cable such as here concerned are lightly insulated. Thus in 5 kv. service there is employed on the conductors C insulation rated at only 600 volts. And in 15 kv. service the insulation employed on the spaced cable conductors is only 5–8 rated kv. With such relatively light conductor insulation walls the aerial cables cannot, of course, withstand or tolerate all the electrical discharges resulting from spacers that will not share a sufficient proportion of the voltage stress.

Accordingly, while the thickness of the insulation is a function of cable design, it also is substantially restricted by aerial cable economics. And the economics which enforce a limitation on the conductor insulation thickness limit also the cable impedance, $Z_c$, and makes it the more important that the entire voltage stress be not placed on the conductor insulation, and further that a favorable $Z_s$ to $Z_c$ ($Z_s/Z_c$) impedance relation be maintained under all weather and environmental conditions. Test results and service records have conclusively shown, of course, that the conductor insulation must remain strong and unharmed if the aerial cable is to remain storm-resistant.

In the FIGS. 1 and 2 embodiment the spaced hereof is integrally constructed with a central, vertical, generally round arm or trunk 9 mounting similar side arms 11, 12 which similarly extend therefrom in opposite lateral directions. The trunk 9 extends upwardly of the side arms and terminates thereabove in a messenger hook 14 having a downwardly opening recess or seat 15 which is engaged to the messenger through an inclined entrant portion 16. The messenger hook is made to grow thinner and wider from the body 9 to the back portion 17 in a manner affording it strength without excess weight to withstand the tendency of the cable to swing on the messenger, and it is thickened at the recess 15 to form a relatively narrow seat of, say, 1 in. width leaving it freedom to rock somewhat relative to the messenger. The hook 14 is also apertured as at 18 to receive a tie wire by which the spacer may be removably secured to the messenger.

The spacer arms 11, 12 are formed generally of inner root or body portions 19, 20 and terminal hooks 21, 22 which are thereby equidistantly spaced from the trunk 9. The body portions 19, 20 have thin sections which are only thick enough to provide the mechanical strength required, and so are defined maximally by vertical straight sides, which have generally lateral or horizontal lower margins, and which at their upper margins taper or incline downwardly from the trunk 9 to the hooks 21, 22. The hooks 21, 22 for the side or A and C phase conductors have wide thin back portions 23, 24 extending in the same axial plane as the backs of the messenger hook 15 and the bottom hook to be described. The side hooks are widened or thickened at their inner or upper margins to define open or parallel sided, round bottomed conductor saddles or seats 25, 26 adapted to receive conductors of different sizes. The conductor seats 25, 26 are seen from FIG. 1 to have their parallel sides inclined one similarly as and the other oppositely to the similar bottom conductor seat, and so as both to open inwardly toward the upper hook 14.

The spacer trunk 9 is seen from FIG. 1 to extend below similarly as it does above the side arm roots 19, 20 and to terminate in a bottom hook 32 formed similarly as the side hooks with a back 33 and an open saddle or seat 34, with the back 33 somewhat larger or wider than its side arm counterparts, for greater strength.

The leakage distances phase to phase and also phase to ground of the spacer are substantially increased under the invention by the provision on the trunk 9 of a series of annular rings or ribs 13 above and a like series 31 below the side arm root body portions 19, 20, and by the provision at each of said side arm roots or body portions of a series of elongated ribs or fins 27, 28 which, like the sides of said body portions, are importantly vertical, or sufficiently so for the desired weather washing, or washing of both their sides by rainfall.

In accordance with the invention the fins 27, 28 project oppositely from the vertical straight sides of and in a plane generally transverse to said spacer body portions, have thin walls and flat sides, and project from relatively narrow roots to a crest height along their length of at least about three times their root cross section. The fins 27, 28 are herein shown as provided three on each side arm, and as extending in all directions from root segments or webs 29, 30 spacing the fins and forming therewith a series of deep troughs or saddles, and which are contoured, as are the trunk segments spacing the ribs 13, 31, for a smoothly curving sinuous or undulating configuration of the spacer thereat.

The ribs or fins 27, 28 follow generally the contour of, and with their crests extending straight vertical similarly as the sides of, the side arm root or body portions 19, 20, except that the fins extend downwardly of the body portions by an additional amount sufficient to compensate for or offset the greater tendency of water to collect and linger at the bottom or downfacing surfaces. The fin series are continued through the body 9 by a pair of ridges or splines 10 oppositely disposed on the transverse axis of the body 9 and of the similar lateral contour and extent as the fins 27, 28.

It will be noted that the widening of the hooks 21, 22, 32 to provide the conductor seats 25, 26, 34 may for light weight be of relatively thin section, may extend laterally or transversely similarly as do the above-mentioned ribs or fins, as shown FIGS. 1–4, and may as herein also extend to either side of the seat backs 23, 24, 34 to the similar extent as the fins 27, 28 project to either side of the side arm webs 29, 30.

In accordance with the invention, the vertical fins in the spacer leakage paths between the phase conductors are provided in proportion and plurality such that the leakage distances measured along the spacer between the phase conductors are substantially greater than the air gap distances between the phase conductors. And the rib and groove or fin and saddle constructions both at the trunk 9 and arms 11, 12 affords the spacer a leakage distance (the arrows LD in FIG. 1) which more particularly is at least 150% of the air gap distance (the arrows CC in FIG. 1) between any two phase conductors, and which in the illustrated embodiments is seen to be substantially 200% or more of that distance. The same 150% or greater excess of leakage distance over air gap distance is not obtained of course as between the bottom phase and the messenger or grounded neutral, but the phase to ground voltage there is generally only 57½% of that which exists phase to phase, and the leakage distance is seen in FIG. 1 to be increased to nearly 15 in. by the provision of the ribs 13, 31.

For particular example, the ribs or fins 27, 28 may taper from a root cross section of, say, ¼ in. to a cross section of, say, ⅛ in. at the top or crest, and over a height of up to, say, ¾ in., to impart to the spacer surface a leakage distance appreciably greater than the air gap distance between phase conductors, in a plurality accommodated within, or without increase in, the conductor spacing as specified for aerial cable. We have not been able to obtain this construction and result with a ceramic or porcelain material, which we consider unusable for forming fins as just described because of the limitations inherent in the ceramic fabrication process. Specifically, and if fabricated of procelain, the fins cannot, on a flat surface, be formed high enough and thin enough, and therefore close enough together, to effect the increase in leakage distance as novelly contemplated by our invention, within the conductor spacing limitation of the aerial cable. Again, the moldability of ceramic and procelain is found not to be such as will permit the providing, within the same given conductor spacing, of leakage distances equivalent to those contemplated and afforded, as just described, by this invention.

The invention spacer is distinguished also by a unique combining of full weather washing with minimizing of contaminant or water collection on and also of water flow along the leakage paths between phase conductors, whereby the cable is safely operated up to at least about 40 kv. under weather conditions not only of favorable dry air but also of adverse rainfall, and particularly rainfall following exposure of the spacer to atmosphere containing dust, chemical deposits, road film or the like contaminants. To that end the spacer has an absolute minimum of protected or unexposed surfaces in the critical areas, that is, anywhere along the leakage paths between the phase conductors. The up-facing and down-facing water and contaminant exposed surfaces of the spacer along the leakage paths are also held to a minimum, and are devoid of pockets or other formations which can collect or trap water or contaminants. This is accomplished in the illustrated embodiment by crowning or sloping downward to either side of the center line the tops of the root segments 29, 30 (considered in the section transverse to the main plane of the side arms 11, 12), with all other of the up-facing surfaces between phase conductors being sufficiently inclined towards the vertical to effect the desired shedding of water.

The invention means for shedding and diverting water and contaminants from spacer leakage paths will be understood further to comprise inclined lateral projections from the spacer body which intersect the spacer leakage paths between any generally vertically related or juxtaposed pairs of cable conductor and messenger elements. Such inclined lateral diverting projections may be variously embodied, and are herein illustrated by the upper straight side portion of the bottom saddle or seat 34, which extends as an inclined fin above the bottom phase conductor C, and overhangs it so as to divert water runoff down the spacer sides away from said bottom conductor seat.

Further, the arrangement of the fins 27, 28 to extend downwardly of the spacer prevents or forces interruption of any water flow in the leakage paths, in that there are provided spaced, lowermost points by and at which the water is made or forced to discharge or fall off as droplets. In this way, the gravity flow of water is mechanically broken up so that it cannot electrically connect the conductors; which is to say there is effectively prevented any concentrating or flow at or along the down-facing surfaces of the spacer of the usual streams or rivulets having many times the cross section and therefore many times the conductivity of the merely wetting coating to which the spacer of this invention is restricted as just described.

Those skilled in the art will readily appreciate that a spacer surface contamniated by dust or the like and which has become wet, as by an atmosphere of high humidity, is far more conductive than a spacer surface exposed to rainfall, and further that the thickness of a wet dust coating is likely to be greater than the thickness of rainfall coating. Accordingly, one of the advantageous consequences of the weather washed design of the instant spacer should be understood as that the periodic wetting of its leakage paths by rainfall is not hazardous but rather is turned to advantage in the respect of regularly washing away and thereby minimizing the build up of any contaminant coating on the spacer. So that the effect of rainfall is a full and free washing but only slight or thin wet coating of a clean uncontaminated surface.

Under this invention, then, charging currents are contained by spacer surface paths of substantially increased length between phase conductors, and which being fully weather washed have a resistance increased substantially proportionately to the increase in length when wet by rain as well as when dried by air. Indeed it has been demonstrated by standard wet or rainfall test at 40 kv. that the spacer hereof has a leakage or surface resistance some 250%–350% greater than prior art spacers including ceramic spacers such as of porcelain and alumina.

It is a further feature of the invention that the spacer should provide a unique and advantageous combination of mechanical properties of weight, strength, and resistance to weather with electrical properties of power factor, dielectric constant, dielectric strength and tracking resistance, whereby the spacer is durable as well as economical, and to the end that the cable may operate safely at voltages up to and including at least about 40 kv. under all normal weather conditions.

In respect to its mechanical properties, the spacer is light enough for easy and economical handling and shipping. It has impact resistance qualifying it as non-shatterable by, for example, high velocity rifle bullets. It has tensile and flexural strength to support the weight of the conductors and the ice loading, impact, and short circuiting forces to which they are subject in use. It is non-absorbent, or impervious to water, and also non-adsorbent, or possessed of a hydrophobic characteristic, by which is meant that capability of repelling surface wetting which results in the formation of droplets, which break up leakage paths, rather than uniform films of water, such as create a continuous conducting path. And it is moldable with a smooth polished surface.

The mentioned electrical properties are to be as good as those of the conductor insulation, which may be a $10/64$ in. extrusion of polyethylene. The dielectric constant is to be as low as possible to minimize the available charging current on the insulated conductor. The power factor is to be low enough to contribute to tracking resistance, or resistance to the formation of electrical conducting paths. The dielectric strength is to be sufficient to force the charging current to go over the surface of rather than to puncture the thickness of the spacer edges or fins. And the spacer material is also to be one not readily vaporized by electrical discharges.

More particularly with respect to its present embodying, the spacer will have a tensile and flexural strength to support the cable conductors under all operating conditions, to be shatterproof on fall from pole height, and to withstand the several hundred pound short circuiting forces produced by fault currents of up to 15,000 amperes. It will be made of lightweight material having a specific gravity of not more than about 1.0, and be impervious to and non-reactive with water. With respect to its electrical properties, the spacer will have a 60 cycle dielectric constant of not more than 2.50, a power factor of not more than about 0.0015, and a 60 cycle dielectric strength of at least 500 volts per mil.

Preferably there is employed for the spacer a non-ceramic, elastomeric, synthetic plastic material selected from the polyolefin class, as combining the recited mechanical and electrical properties, and such as, for example, polypropylene, or, preferably, high density polyethylene, electrical grade, such as manufactured for example by Phillips Petroleum Company, of Tulsa, Oklahoma, under the name Marlex. The stated material may be employed in the usual formulation except that the normal 2½% carbon black is reduced to, say, ½%, substituting, say, 0.3% of one of the available ultraviolet absorbers.

The polyolefin spacer hereof will be understood to be greatly superior to conventional spacers in respect to the properties concerned. Thus the polyolefin density of 0.96 gram per cubic centimeter compares with a density for alumina of 3.6 grams and a porcelain density of 2.4 grams. The polyolefins are hydrophobic, or impermeable to water, and are unaffected by corrosion or mild acid solutions which may be found in contaminated atmospheres. And they may be molded with a hard polished surface less wettable than glazed ceramic, shedding water and contaminate easily and with no tendency to form a uniform or continuous film.

The polyolefin spacer hereof has marked superiority also in respect to the electrical properties. It is an excellent insulator with, in the case of high density polyethylene, a low dielectric constant of about 2.5 (which compares with 8.0–11.0 for alumina and 5.0–7.0 for porcelain). And it has a desired low power factor of about 0.0015, and a desired high dielectric strength of 500 volts per mil (measured on ⅛ in. specimen).

Aerial cables are designed for trouble-free operation for twenty years or more, and it is yet another feature of the invention that cables employing the spacer hereof may be worked, as for repair of one or more conductors, or replacement of spacers, while "hot," or energized, thereby eliminating the necessity of interrupting service to customers. This is accomplished by the provision of the described open seats permitting individual insertion or removal of conductors of varying size and, in combination with said seats, of novel conductor tie means which are readily manipulated with insulated tools, which secure the conductors by as little as a single wrapping or winding thereabout, and which are fastened to and released from the spacer by simple push-pull movement.

The novel tie means hereof, such as illustrated in FIGS. 5 and 6, will be understood generally to removably secure different sizes of conductors to the spacer by passing therearound and anchoring in the slots 39 with which the hook back portions are provided. The invention tie comprises an elastic band or the like, in the FIG. 5 form the strip 40, provided with manipulating elements such as the projecting rings or loops 41 and having also, in said FIG. 5 form, grooves or recesses 42 adjacent thereto for a clamping or friction fit in the recesses 39. For adjustably fitting different sizes of conductors the FIG. 5 tie 40 is provided at one end with a series of the slot fitting grooves 42 formed between balls or beads 43 spaced by and defining shoulders of the grooves.

In accordance with the invention there is selected for the tie means or bands a material which is flexible and elastic, track resistant, ozone resistant, corona discharge resistant and weather resistant (resistant to degradation by sunlight), such material being for example, polyurethane, electrical grade, such as manufactured, for example, by B. F. Goodrich Co., of Cleveland, Ohio, under the name Estane.

The FIG. 5 form of the tie may be used with hooks having at least two of the slots 39, as in the case of all and particularly the bottom hooks in FIGS. 3 and 4, in which one slot is shown as deeper than the others illustrated in the drawings to permit the use with the wider backed bottom hook of the same size tie as for the side hooks.

In the FIG. 6 form the tie is longer and provided with a plurality of the grooves 42 at its midpoint, whereby it is adapted to hooks having at least three of the slots 39 as at the left and right side hooks of FIGS. 3 and 4.

In securing a conductor with the FIG. 5 form as shown at the bottom hook in FIGS. 3 and 4, the tie 40 is engaged in one slot 39 at the end having the single groove 42, and the free end of the tie is carried or stretched across the seat and over the conductor and is then engaged from the other side of the spacer in the other of the slots 39, by whichever of the series of grooves 42 at that other end makes the desired tight or tensioned fit around the particular size conductor which may be seated in the spacer.

To tie the conductors with the FIG. 6 form in the mode illustrated at hook 22 at the right side in FIG. 3 and at the left side in FIG. 4, the tie is pressed at its midpoint groove 42 into one of the slots 39, the free halves of the tie are passed over the conductor to one side of the spacer, and the end rings 41 are passed under the hook back 24 and anchored thereto by pressing at the end grooves 42 into the other two of the three slots 39 with which the side hooks are provided.

In tying a conductor in the manner shown at hook 21 at the left in FIG. 3 and at the right in FIG. 4 the midpoint groove 42 is pressed into the intermediate one of the three slots 39, and the free ends are simply criss-crossed over the conductor and spacer, FIG. 4, with the ends being secured in the outer two of the slots 39.

It will be understood that the foregoing manipulations, whether to install, repair, or replace one or more conductors or spacers, may be performed with insulated tools or "hot sticks" just as readily as with insulated gloves, and by pushing or pulling the manipulating elements or rings which are seen to project readily to be engaged or grasped for that manipulation. To apply it to the cable the tie 40 is lifted by its rings 41 and engaged in a slot 39 by one groove 42. One hot stick is then used to force a free end of the tie upward until it may be hooked by the other stick, then pulled down over the conductor, then brought under the spacer, and then finally pushed upward to engage another of the grooves 42 in another slot 39, in the described pulling and pushing the elastic tie being stretched, tensioning its engagement around the conductor and behind the spacer, and thereby additionally (to the aforementioned fit) securing it in the slots 39. Only one hot stick will of course be required to disengage the tie, by hooking onto one or successively both of the rings 41 and pulling them free of the slots 39, whereby the thus freed end or ends of the tie will spring back over the top of the conductor such that the tie may then be pulled downwardly free from the spacer.

Considering now the FIGS. 3 and 4 embodiment of the spacer, it will be apparent from the foregoing that the same departs from the FIGS. 1 and 2 form only in that it has for greater strength a separable brass or other metal upper hook comprising a cap 35 which may be screwed as by the threads 36 onto the upper end of the thus terminated trunk 9. Cap 35 has a ball and socket or other swivelling fit with the received stem of a hook member 37 engageable over the messenger M and carrying a clamp 38 which may be turned up to lock the spacer onto the messenger as indicated in FIG. 3.

The invention spacer is installed as conventionally at, say, 30 ft. intervals between means such as poles for elevated support of the messenger. To attach the FIGS. 1 and 2 form to the messenger M a wire is simply passed through the aperture 18 and wound tightly about and to frictionally engage the messenger at either side of the spacer. The tie wire may be a copper wire stiff enough by such winding to hold the hook 14 firmly to the messenger M.

The manner of securing the FIGS. 3 and 4 form of the spacer has already been indicated as requiring merely the turning up of the clamp 38 to seize the messenger between it and the hook 37.

From the foregoing it will be understood that the cable spacer or insulator of this invention is distinguished by a conformation as at the hooks, ribs, and fins which breaks all direct leakage paths between phase or phase to ground while retaining mechanical properties needed for long service life. It has a sinuous undulating surface by which the leakage distances between phases are extended sufficiently to prevent arcing and flashover, and which is distinguished by vertical surfaces whereby the leakage paths are made completely weather washed. The spacer is of one piece construction simplifying installation and minimizing inventory, while retaining adequate strength and greatly increased shock and impact resistance, along with stability in sunlight and under all outdoor weathering conditions, whereby it has an expected useful life of thirty years or more.

The invention spacer will be understood further to simplify assembly of the cable by supporting the phase conductors in its seats while they are being secured by the invention tie means, which tie means are shown to permit removal of one or more conductors independently of the others and without requiring disassembly of the spacer, and to be manipulable under safety rules and with insulated tools whereby the cable may be worked on while energized.

Our invention is not limited to the particular embodiment thereof illustrated and described herein, and we set forth its scope in our following claims.

We claim:

1. A spacer for aerial cable of the class having lightly insulated phase conductors and an elevated supporting messenger,
   the spacer characterized by a surface impedance sufficiently high in relation to the impedance of the conductor insulation to prevent voltage breakdown and resultant cable failure under all normal outdoor overhead operating conditions of weather and atmosphere, and comprising
   a rigid integral body presenting seats for the conductors of the cable, and formed also for engaging to the cable messenger,
   said body constructed and arranged for equilateral triangular spacing of said conductor seats and for suitably balanced surface leakage paths from the phase conductors individually to ground,
   said spacer body formed in the leakage paths intermediate the conductor seats with portions having minimum upfacing and downfacing weather exposed surfaces and maximum sidefacing water shedding surfaces,
   whereby the surfaces of said spacer body portions in said leakage paths are water shedding and are thereby self-maintained in washed clean condition,
   said body portions integrally formed also with a plurality of laterally spaced vertically disposed fins projecting from said water shedding surfaces at the opposite sides of the body portions,
   said fins intersecting and extending the leakage paths between the phase conductors and provided in proportion and plurality such that the leakage distance measured over the spacer surface between the phase conductors is at least about 150% of the leakage distance measured along the air gap between the phase conductors,
   said spacer body fabricated from an insulating synthetic plastic material which is of suitable tensile and flexural strength and impact resistance, which has a hydrophobic surface characteristic, which is impervious to water, which is track-resistant, which is not readily vaporized by electrical dischargers, and which is moldable with a smooth polished surface, and said spacer body material having a dielectric constant which, in combination with said material properties and constructional features, accords the spacer a high electrical surface resistance under all normal weather conditions, said spacer, by said all-weather high electrical surface resistance, attaining and maintaining an impedance which protects said aerial cable conductors from harmful voltage stresses, leakage currents and corona discharges, and which thereby preserves the conductor insulation intact and the aerial cable storm-resistant, in and throughout prolonged outdoor overhead operating service.

2. An aerial cable spacer according to claim 1 wherein transverse oppositely extending projections are provided on the surface of said spacer to intersect the leakage paths of said spacer between conductor and messenger elements that are in generally vertical juxtaposition, said projections constructed and arranged to divert the water runoff down the sides of said spacer out of said leakage paths between, and away from the underlying one of, said vertically juxtaposed conductor and messenger elements.

3. An aerial cable spacer according to claim 1 wherein said intermeditae body portions have a thin section and generally vertical and straight sides.

4. An aerial cable spacer according to claim 1 wherein the spacer fins project downwardly of the spacer body sections to break the leakage paths between the phase conductors at the downfacing spacer body surfaces, said fins preventing the concentrating and flow of water at and along said downfacing surfaces.

5. An aerial cable spacer according to claim 1 wherein the conductor seats all have inclined parallel sides and round bottoms, and wherein the side conductor seat sides are inclined one similarly as and the other oppositely to the bottom conductor seat sides and so as both to incline inwardly towards the messenger engaging means.

6. In an aerial spacer cable a spacer having means for securing it to the cable messenger and open seats in which the cable conductors may be deposited when the spacer is installed on the messenger, tie-engaging formations provided on said spacer behind said open conductor seats, tie means for holding the conductors to said seats, said tie means of flexible, elastic, track-resistant, ozone-resistant, corona-discharge-resistant, and weather-resistant material, the tie means passed across and to close over said open conductor seats and engaging said spacer formations behind said seats to releasably secure different sizes of said conductors, said elastic tie means stretched in passing across said conductor seats whereby they are in tensioned engagement with said cable conductors and with said spacer formations behind said seats, and manipulating elements provided on the tie means, said manipulating elements projecting when said means are in said tensioned engagement and also adapted to be grasped and subjected to push-pull, tie-engaging and disengaging manipulation by insulated tools as well as with insulated gloves, whereby the cable conductors may be repaired and the cable spacer replaced without interruption of electrical service.

7. An aerial cable according to claim 6 wherein the tie means are of urethane material.

8. An aerial cable according to claim 6 wherein said manipulating elements of said tie means are integral ring formations.

References Cited by the Examiner
UNITED STATES PATENTS

| D. 189,090 | 10/1960 | Kelm. | |
| D. 195,205 | 5/1963 | Price. | |
| 2,453,319 | 11/1948 | Hollyday. | |
| 2,976,344 | 3/1961 | Bethel | 174—146 |
| 3,021,381 | 2/1962 | Wengen | 174—146 |
| 3,084,892 | 4/1963 | Priestley et al. | 174—146 X |
| 3,095,471 | 6/1963 | Price | 174—146 X |

LARAMIE E. ASKIN, *Primary Examiner.*